Jan. 14, 1964

T. C. MURRAY ETAL 3,117,333

APERTURE CARD CLEANER

Filed Nov. 22, 1961

INVENTORS
JOSEPH B. STONE
THOMAS C. MURRAY

BY

ATTORNEY

Jan. 14, 1964

T. C. MURRAY ET AL 3,117,333

APERTURE CARD CLEANER

Filed Nov. 22, 1961

INVENTOR.
JOSEPH B. STONE
THOMAS C. MURRAY

BY

ATTORNEY

Jan. 14, 1964    T. C. MURRAY ETAL    3,117,333
APERTURE CARD CLEANER
Filed Nov. 22, 1961    7 Sheets-Sheet 4

INVENTOR.
JOSEPH B. STONE
THOMAS C. MURRAY
BY
ATTORNEY

Jan. 14, 1964       T. C. MURRAY ETAL         3,117,333
                    APERTURE CARD CLEANER
Filed Nov. 22, 1961                        7 Sheets-Sheet 6

INVENTORS
JOSEPH B. STONE
THOMAS C. MURRAY
BY
ATTORNEY

United States Patent Office 3,117,333
Patented Jan. 14, 1964

3,117,333
APERTURE CARD CLEANER
Thomas C. Murray, Rochester, and Joseph B. Stone, Penfield, N.Y., assignors to Xerox Corporation, Rochester, N.Y., a corporation of New York
Filed Nov. 22, 1961, Ser. No. 154,259
4 Claims. (Cl. 15—1.5)

This invention relates to a cleaning device and, in particular, to a device for cleaning dust from microfilm frames mounted in data storage or processing cards.

Microfilming of documents is widely used because of its low cost and because large amounts of information can be stored in a small volume. To extend the use of microfilm, various means are used to retrieve the information stored thereon, such as by making reproductions from the microfilm. When reproductions are made from microfilm, it is customary to make enlargements or blowbacks usually to the same size as the original document previously microfilmed.

One of the difficulties in making enlargements from microfilm is the presence of dust particles on the film. Although the individual dust particles may be small, when magnified in the production of the enlargement of the image on the microfilm, these dust particles show up as large imperfections on the reproduction.

To permit retrieval of information contained on microfilm, it is now common practice to mount individual frames of microfilm in die-cut apertures in data storage or processing cards or accounting machine tabulation cards for machine sorting. These cards, with the microfilm frame mounted therein, are known generically as aperture data processing cards. In the common machines used for sorting these cards, it is conventional to feed the cards through numerous sets of feed rollers. Since the cards are formed of a non-conductive material, the cards, when advanced in frictional contact with the feed rollers, pick up a static charge of electricity which will cause loose dust particles to be attracted to the card and to the microfilm frames mounted therein and to adhere to the surface of the cards and microfilm frames by electrostatic attraction so tightly that conventional cleaning means will not remove them.

It is therefore the principal object of this invention to improve cleaning mechanisms for cleaning dust particles from microfilm mounted in data storage or processing cards.

Another object of this invention is to improve film cleaners for removing adherent dust particles from the surface of film mounted in data storage or processing cards.

These and other objects of the invention are attained by means of a card feeding mechanism for feeding cards seriatim from a stack of cards in a supply tray to a conveyor mechanism for advancing the cards into contact with a pair of rotating brushes for removing dust particles from the cards and from the film mounted therein, the brushes being mounted in an area in which a constantly reversing electrostatic field is generated to damp out or neutralize the static charge on the cards, means being provided to create a reduced pressure zone around the brushes to aid in the removal of dust particles from the cards.

For a better understanding of the invention, as well as other objects and further features thereof, reference is had to the following detailed descriptions of the invention to be read in connection with the accompanying drawings, wherein.

Figure 1:
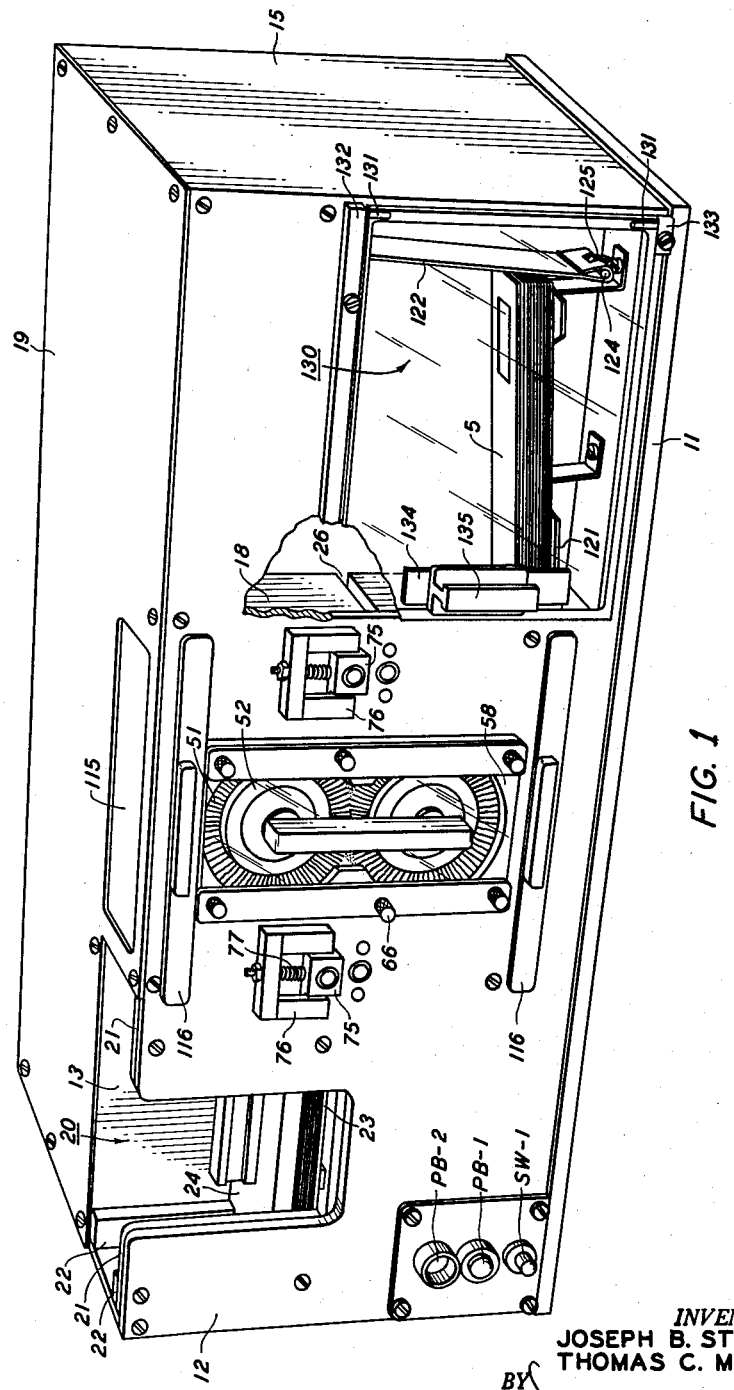
FIG. 1 is a right-hand perspective view of the cleaning device of the invention.
Figure 2:
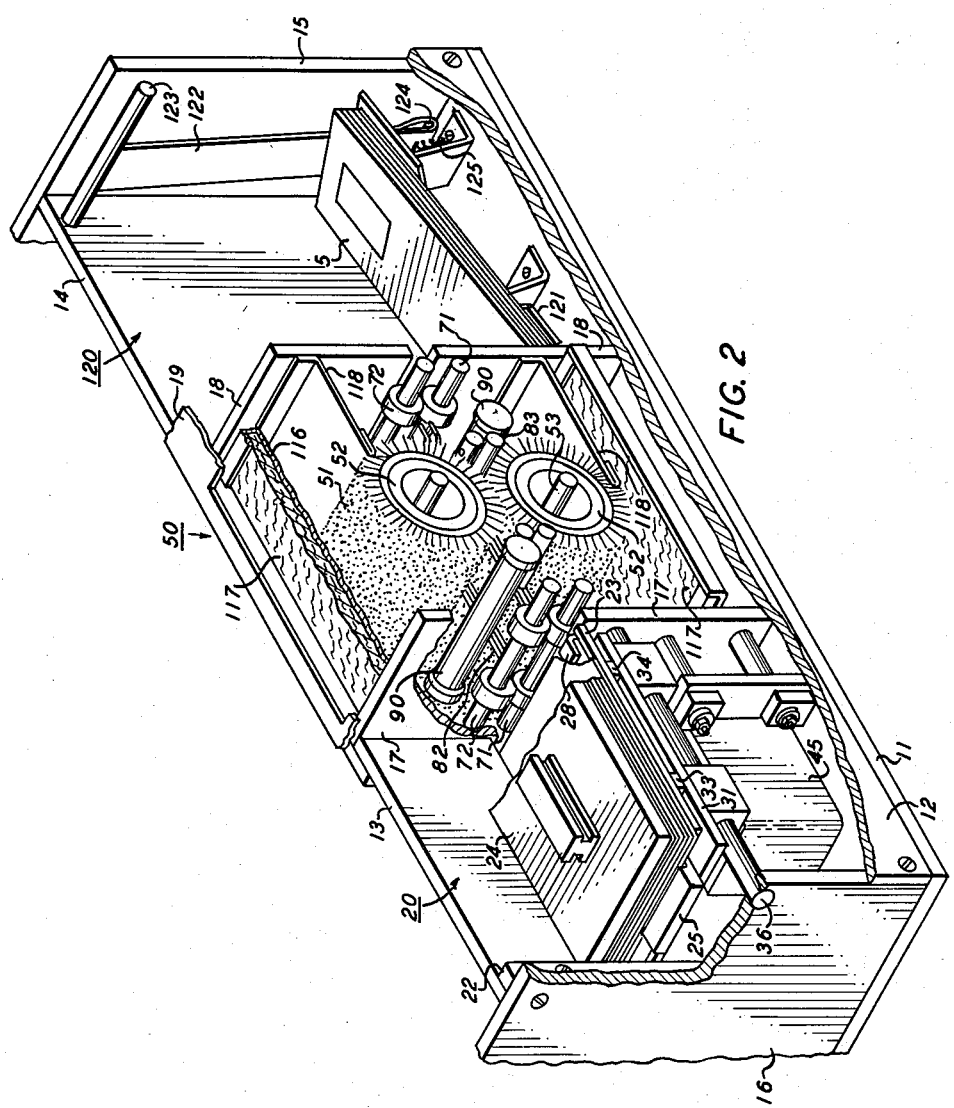
FIG. 2 is a left-hand perspective view of the cleaning device with parts broken away to show the arrangement of the interior of the cleaning device.
Figure 3:
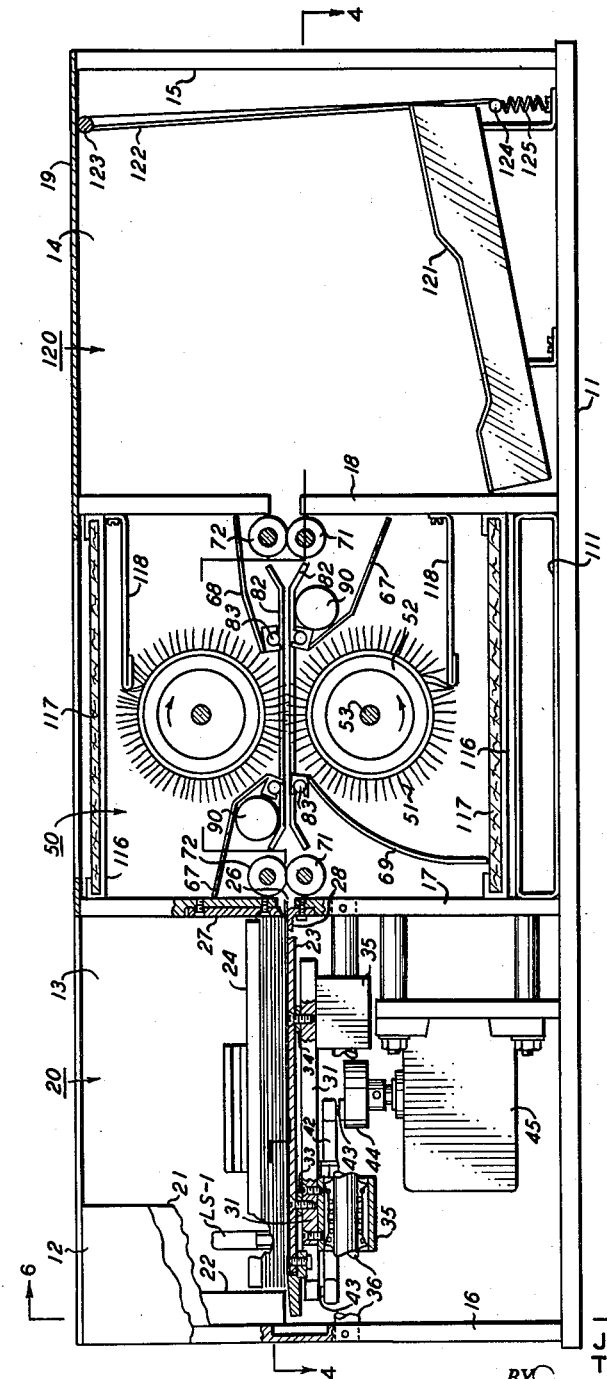
FIG. 3 is a front view of the device with parts broken away to show the major components of the device.

As shown in FIGS. 1, 2 and 3, the cleaning device of the invention includes a card storage and feed compartment 20 from which cards 5 to be cleaned are advanced to a card cleaning compartment 50 wherein the cards are forwarded between a pair of rotating brushes to remove dust particles from the surfaces of the cards and then into a card receiving compartment 120. A pair of electrostatic eliminators are mounted within the cleaning compartment to generate a constantly reversing electrostatic field to damp out any static charge on the cards and the microfilm frames mounted therein whereby dust particles may be completely removed from the cards and microfilm frames by the brushes. To remove dust laden air from the cleaning compartment, the cleaning compartment is connected to the inlet duct of a blower or other suitable mechanism whereby a reduced pressure zone is formed around the cards and brushes.

For supporting the components of the apparatus there is provided a frame formed by a base plate 11 to which are mounted front plate 12, rear card dealer plate 13 and a rear plate 14, the latter two being positioned in spaced parallel relation to the front plate; right-hand plate 15, left-hand plate 16, and intermediate plates 17 and 18, the latter plates forming with the front plate, rear card dealer plate and the rear plate and a sheet metal cover 19 the previously described separate compartments.

Again referring to FIGS. 1, 2 and 3, the card storage and feeding compartment, includes a card magazine for holding a stack of cards. The card magazine is defined on one side by rear card dealer plate 13 and on its opposite side by card spacers 21 secured to front plate 12. Opposite ends of the card magazine are defined by intermediate plate 17 at one end, and at its other end by rear card spacers 22, one of which is secured to rear card dealer plate 13, and the other is secured with one of the card spacers to front plate 12. The cards to be cleaned are placed in the magazine and are supported on a table 23 therein, the customary weighted pressure plate 24 being provided to press the stack of cards downward to cause the lowermost card to be engaged by a picker 25 mounted on the left-hand end of the table. A single pole double throw limit switch LS is secured to the rear card dealer plate 13 with its actuator arm extending through an aperture in the plate into the interior of the card magazine for a purpose to be described.

A reciprocating feeding device is provided whereby the picker 25 by engagement with the lowermost card will force the card out of the stack through a card throat 26, formed by guides 27 and 28 partly closing a slot aperture in intermediate plate 17, to the first set of feed rollers 71 and 72.

The reciprocating feeding device includes a reciprocable member 31 supporting the table 23 on which the picker is fastened. As shown, tapered spacers 33 and 34 are provided between the reciprocable member and the table to tilt the table sufficiently so that one edge of the cards, front facing edge of the cards as seen in FIG. 1, will be aligned against the card spacers 21.

The reciprocable member 31 is supported and guided for lineal movement on one side by bearings 35 riding on a guide rod 36 fixed to left-hand plate 16 and intermediate plate 17, and on its other side by means of a guide roller 37 secured to a side extension of the reciprocable member 31. The side extension of the reciprocable member 31 extends through a suitable elongated aperture in the rear card dealer plate 13 whereby the guide roller 37 can ride in a table guide 41 secured to the rear card dealer plate 13 in alignment with the elongated aperture therein.

Figure 6:
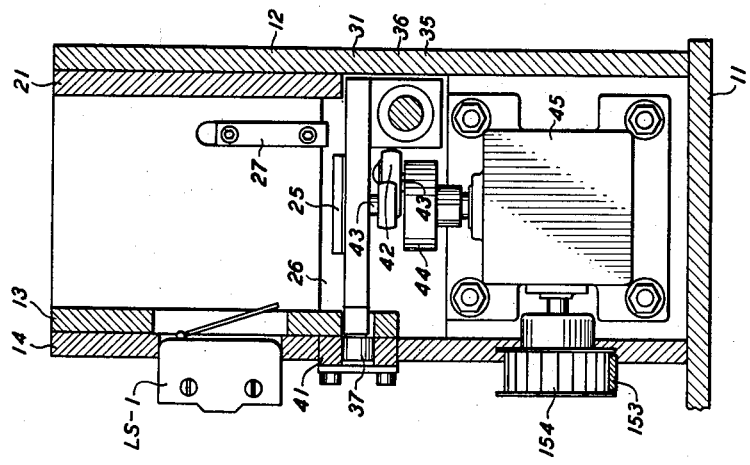
FIG. 6 is a sectional view taken along line 6—6 of FIG. 3.
Figure 7:
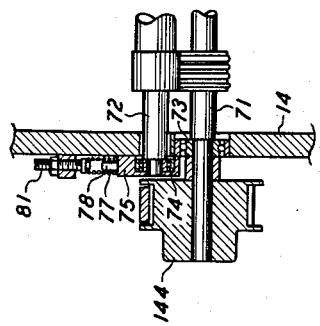
FIG. 7 is a sectional view taken along line 7—7 of FIG. 4.

As seen in FIGS. 3 and 6, lever 42 is connected at one end by a pivot pin 43 to the reciprocable member and at its other end to a second pivot pin 43 positioned eccentrically on the hub 44 secured to the output shaft of the speed reducer 45 driven by a suitable drive mechanism as described in detail hereinafter.

Cards advanced by the picker 25 from the card magazine in the card storage and feed compartment 20 are guided through the card throat 26 into the bite of a first set of feed rollers 71 and 72 positioned at one end of the cleaning compartment 50. A second set of feed rollers 71 and 72 is provided at the opposite end of the cleaning compartment for discharging the cards into the card receiving compartment 120. The two sets of feed rollers, similar in construction to each other, are used to advance and withdraw the cards through the cleaning brushes.

Each of the brushes 51 includes a substantially cylindrical assembly that is preferably formed of animal fur secured to a rigid cylinder. Each brush is supported at opposite ends by truncated cone-shaped inserts 52 provided with teeth thereon to grip the brush for rotation therewith. At one end the brush is supported by an insert 52 fixed to the end of a shaft 53 journaled in a bearing 54 mounted in the bearing support 55 secured to the back of rear plate 14. The top brush is driven by means of a pulley 142 and the bottom brush is driven by pulley 143, each pulley being fixed to the opposite end of the respective shafts 53 from the inserts. A brush spacer 56 encircles the shaft to insure correct positioning of the insert on the shaft.

At its opposite end each brush is supported by an insert 52 rotatably and movably mounted on one end of arbor 57. The threaded end of the arbor 57 extends through a suitable aperture in the cover plate 58 secured to cover an opening 65 in front plate 12, and is threaded into a rigid support bar 61 secured to the cover plate. The cover plate is preferably made of a transparent materials such as clear Lucite to enable the operator to view the interior of the cleaning compartment. The inserts 52 on the arbors 57 are resiliently biased into driving engagement with the respective brush by springs 62 positioned between thrust washers 63 encircling the arbors. Retaining rings 64 are positioned in suitable grooves formed in the free end of the arbors to retain the inserts on the arbors.

The cover plate 58 is provided with suitable apertures whereby it may be removably secured to the frame plate 12 over the opening 65 formed therein by fasteners 66.

The feed rollers 71 and 72 are mounted in cooperative relationship to each other for rolling contact with each other or with a card sandwiched therebetween. Each bottom roller or drive roller 71 is journaled in bearings 73 mounted in front plate 12 and rear plate 14, and has a drive pulley 144 secured thereon. Each upper roller or driven roller 72 is journaled in bearings 74 mounted in bearing blocks 75. The driven rollers extend through suitable elongated vertical slots in the front plate 12 and rear plate 14 to permit vertical movement of these rollers. The bearing blocks 75 are slideably mounted in bearing block guides 76 secured outboard of the front plate 12 and rear plate 14. Compression springs 77 are provided to bias the driven rollers into cooperating engagement with the drive rollers or a card sandwiched therebetween. The compression springs 77 encircle at one end stationary pins 78 provided on the top of each bearing block 75 and at their other ends the compression springs encircle spring retaining screws 81 adjustably threaded into the bearing block guides 76.

To guide the cards from the first set of feed rollers between the brushes to the second set of feed rollers, there is provided two sets of upper and lower wire card guides 82, secured as by soldering, to card guide supports 83 positioned inboard of front plate 12 and rear plate 14.

A pair of electrostatic eliminators or inductors, generally designated 90, are mounted on opposite sides of the brushes 51 to generate a constantly reversing electrostatic field to damp out or neutralize the static charge on the cards to facilitate the removal of dust particles from the cards and to remove static electricity from the cards after the cleaning operation between the brushes so that the cards will not attract the dust particles again. The electrostatic eliminators, or inductors, may be of the type similar to the "Kodak 4" shock-free inductor, sold by Eastman Kodak Company, Rochester, New York.

Figure 8:
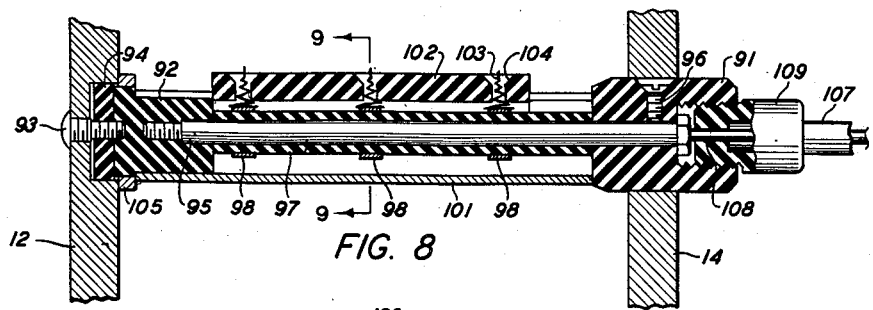
FIG. 8 is a sectional view of an inductor.
Figure 9:
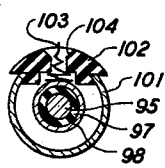
FIG. 9 is a sectional view taken along line 9—9 of FIG. 8.

As shown in FIGS. 8 and 9, each of the electrostatic eliminators or inductors 90, includes a pair of mounting blocks 91 and 92, the mounting block 91 being positioned in a suitable aperture formed in rear plate 14, the mounting block 92 being secured to front plate 12 by a screw 93 extending through the front plate and through a washer 94 into the mounting block. The mounting blocks 91 and 92 and the washer 94 are made of a suitable insulating material.

A conductive electrode 95 extends through the mounting block 91 and is threaded at its opposite end into the mounting block 92, the electrode 95 being locked in position by means of a set screw 96 threaded into the mounting block 91.

A sleeve 97, made of suitable insulating material, encircles the electrode 95 between the mounting blocks 91 and 92. A number of electrical contact rings 98, encircle the sleeve 97 in spaced relation to each other. Extending between the first and second mounting blocks is a conductive sleeve 101 partly enclosing the electrode 95, sleeve 97 and contact rings 98. The conductive sleeve 101 has a slot extending the full length thereof to receive an elongated insulating block 102.

Mounted within suitable apertures 104 formed in the insulating block 102 are a number of wire electrodes 103 each formed as a coil spring at one end and as a needle point at its other end. These electrodes are shaped in the form of a spring at one end, so that the coiled portion of the spring, which cannot extend into the apertures 104 of insulating block 102, will normally be biased into electrical contact with their respective contact rings 98, it being noted that the number of contact rings used is equal to the number of electrodes.

The sleeve 101 contacts a ground ring 105 encircling the mounting block 92, the ground ring being made of sufficient thickness so that it butts against front plate 12, whereby the inductor 90 is grounded by its conductive sleeve 101 via the ground ring 105.

The electrostatic eliminators or inductors 90 are connected to a high voltage power supply 106, such as a Kodak static eliminator power unit, Model A2, marketed by Eastman Kodak Company, Rochester, New York. The inductors are connected to the high voltage power supply by means of a conductor cord 107 having an electrical conductive terminal 108 protruding beyond the limit of a connector 109 secured to one end of the conductor cord. The connector 109 is threaded into the mounting block 91 to force the electrical conductive terminal 108 into contact with the conductive electrode 95.

The high voltage power supply 106, in the embodiment illustrated, is a ¼ amp., 115 volt, 50–60 cycle A.C. transformer having a secondary output of approximately 3500 volts. The current capacity of the secondary is safely low. To provide further safety, the electrode 95, sleeve 97 and contact rings 98 form a small capacitor placed in series with the high voltage ionizing points of the wire electrodes 103.

In the operation the ionizing points of the wire electrodes 103 ionize the surrounding air by high voltage discharge. The air then acts as a conductor to bleed static charges from the surfaces of the cards, so that these surfaces will not attract or hold dust particles.

The static eliminating inductors in the cleaning compartment neutralize any static charge on the cards, or any static charge induced on the cards by frictional contact with the brushes 51.

To further aid in the removal of dust particles from the cleaning compartment there is provided an exhaust conduit or air discharge opening 111 in the lower portion of rear plate 14 which is connected to one end of a blower suction chamber 112. At its opposite end, the blower suction chamber 112 is connected to the inlet of a conventional motor M-2 driven blower 113 secured to the base plate 11. A suitable filter bag 114 is secured to the outlet of the blower to prevent dust particles from entering the atmosphere.

The cover 19, attached to the frame plates to enclose the moving parts of the apparatus, is provided with an air inlet opening 115 positioned above the cleaning compartment to allow the ingress of air into the cleaning compartment. Suitable apertures are provided in the front plate 12 to permit filter drawers 116 to be inserted at the cleaning chamber, one of the filter drawers being positioned above the upper brush and the other being positioned beneath the lower brush across the full width of the cleaning compartment whereby the flow of air from the exterior of the apparatus must pass through the top filter drawer around the brushes, then through the bottom filter drawer and then out the exhaust conduit. Preferably suitable filters 117 are positioned in each of the filter drawers although one or both filters may be eliminated to reduce the pressure differential across the unit.

In operation, the blower will produce a flow of air through the inlet opening and top filter into the cleaning compartment; the air entraining dust particles removed from the card as the air flows through the cleaning compartment. Dust particles are separated from the dust-laden air as it passes through the bottom filter and the filter bag so that only clean air is discharged from the cabinet through suitable exhaust openings. As illustrated in FIG. 3, dust baffles 67, 68 and 69, are secured within the cleaning compartment. These dust baffles are used to control the flow of air within the cleaning compartment, to direct the flow of dust-laden air toward the exhaust conduit 111, and to prevent dust particles in the cleaning compartment from redepositing on the cards which have been cleaned.

To further aid in the removal of dust particles from the brushes, flicking bars 118 are provided which are secured to plate 18, to extend into the nap of the brushes to sufficiently dislodge dust particles therefrom. As the brushes contact the flicking bars, the rapid displacement of the bristles of the brushes creates a reduced pressure zone on the discharge side of the brushes so that air will flow into the cleaning compartment from the card receiving compartment, thereby preventing dust particles removed in the cleaning compartment from entering the card receiving compartment to recontaminate the cleaned cards.

From the cleaning compartment the cleaned cards are discharged by the second set of feed rollers 71 and 72 through a suitable aperture formed in the intermediate frame plate 18 into the card receiving compartment 120. To receive the cards there is provided a card receiving tray or card receiving magazine 121 secured to the base plate 11 within the compartment. To stop the forward progress of the cards and to aid in aligning the cards in the card receiving tray or magazine there is provided a card bumper 122 at the far end of the receiving compartment. The card bumper is secured at one end by a bumper support rod 123 extending between front plate 12 and rear plate 14. At its other end the card bumper is folded over to receive a bumper pin 124. The card bumper is held resiliently in position by means of a bumper tensioning spring 125 secured at one end to pin 124 and at its other end fixed to the base plate 11. Since the card bumper is resiliently maintained in position, it will yield to and absorb the force of a card, as the card strikes it, to prevent damage to the leading edge of the card. This structure forms a flexible card baffle to check the forward path of the cards and to deflect the cards into the card receiving magazine or tray 121.

After cleaning, the cards are removed from the receiving compartments through a suitable opening in front plate 12. The opening in the front plate 12 is normally closed by a door 130, preferably made of clear Lucite. The door 130 is pivotably secured over the opening by means of pins 131 loosely extending into the door and into a top door rail 132 and bottom door rail 133. The door normally held in a closed position by means of a conventional magnetic door catch 134 secured to front plate 12 within the card receiving compartment. The magnetic door catch 134 cooperates with a suitable handle 135 secured to door 130.

Figure 4:
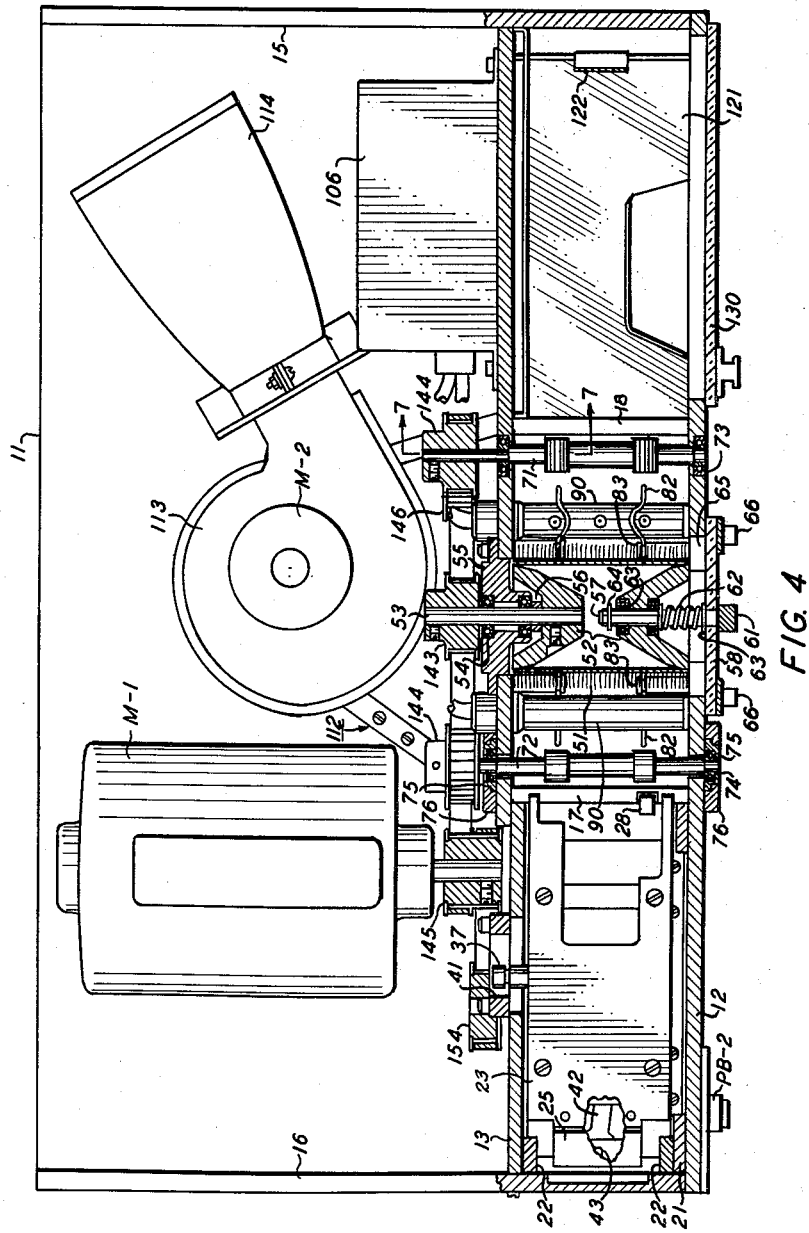
FIG. 4 is a sectional view taken along line 4—4 of FIG. 3 with the pressure plate removed.
Figure 5:
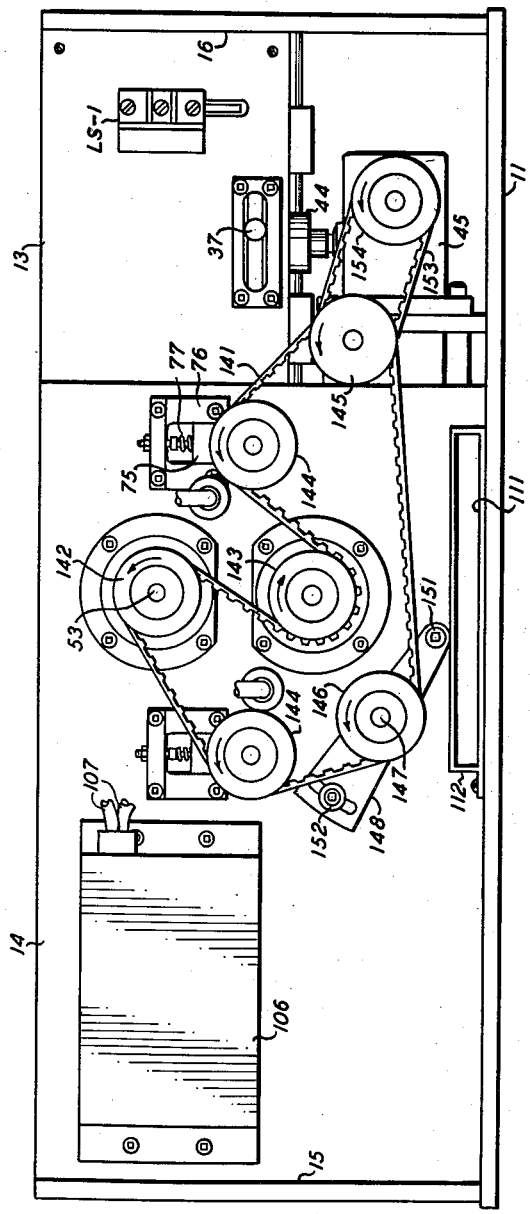
FIG. 5 is a rear view of the drive elements of the device.

The drive feed rollers and the brushes are driven by a main drive motor M-1 connected to a source of electric power and is controlled by switching means described in detail hereinafter. As shown in FIGS. 4 and 5, the drive feed rollers and brushes are connected to the motor M-1 by belt 141, which runs on pulleys 142 and 143, fixedly mounted on shafts 53 of the brushes, as previously described, pulleys 144 mounted on the drive rollers and on compound pulley 145 fixed to the shaft of the main drive motor M-1. The pulley 143 driving the lower brush 51 has a rubber covered surface so that it can be driven off the back of the belt 141. Belt tension is maintained by means of an idler pulley 146 journaled on idler post 147 secured to idler arm 148. Idler arm 148 is pivotably secured at one end to the rear plate 14 by pivot stud 151. The idler arm 148 is secured in adjustable position by means of a screw 152 threaded into rear plate 14, the screw projecting through an arcuate slot provided in the idler arm.

The speed reducer 45 is operatively connected to the motor M-1 by timing belt 153 which runs on the pulley 154 fixedly mounted to the input shaft of the speed reducer and on the compound pulley 145 fixed to the shaft of motor M-1.

Figure 10:
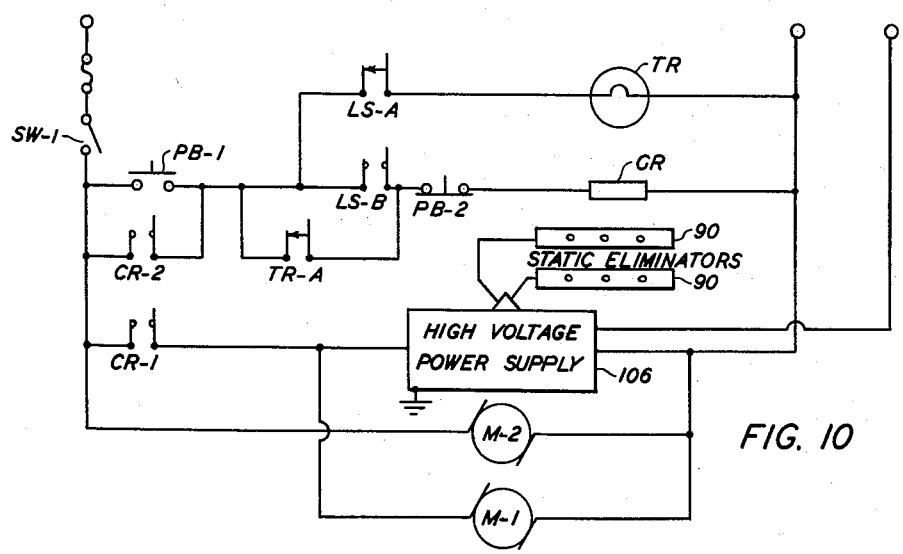
FIG. 10 is a schematic electrical wiring diagram of the cleaning device.

A clearer understanding of the operation of the cleaning apparatus and of the electrical circuit controlling the various elements can best be obtained by reference to the schematic wiring diagram, FIG. 10.

With a supply of data storage or processing cards 5 in the card magazine, the first operation on starting the machine is for the operator to depress the pre-start button or switch SW-1 connecting the assembly to a suitable source of power.

Upon closure of switch SW-1, the blower motor M-2 is energized to permit the blower to operate to create a reduced pressure zone in the cleaning compartment 50.

After a short period of time to permit a reduced pressure zone to be effected in the cleaning compartment, the operator can energize the remaining elements by momentarily closing the normally open push button start switch PB-1. Upon closure of start switch PB-1, control relay CR is energized to close its contacts CR-1 and CR-2. When the data storage or processing cards were previously inserted in the card magazines, the actuator arm of limit switch LS was moved into position to open its contact LS-A and to close contact LS-B to permit the control relay CR to be energized through the normally closed push button stop switch PB-2.

With the closure of contact CR-2, the start switch PB-1 may be released, the circuit then being maintained through the normally closed contact TR-A of thermal timer TR or the closed contact LS-B of limit switch LS and normally closed push button stop switch PB-2 to supply power to the control relay CR to keep its contacts closed.

As contact CR-1 is closed, the static eliminators or inductors 90 are energized through the high voltage power supply 106, and the main drive motor M-1 is energized.

During the operation of the device, the controls stay in this position until the last card has been fed from the card magazine. As the last card is removed from the card magazine and therefore out of contact with the actuator of limit switch LS, contact LS-B is opened and contact LS-A is closed to energize thermal relay TR. If an additional supply of cards are not placed in the card magazine for a short period of time, the thermal timer will heat sufficiently to open its contact to de-energize the entire circuit. The heating time of the thermal timer is chosen to insure that the static eliminators are not de-energized until the last card has advanced into the card receiving compartment. This period of time is sufficient to permit an operator to place additional cards in the card magazine before the device is de-energized. If the operator does not use the machine for a period of time, the machine will automatically shut down, except for the blower motor M-2, which must be de-energized by opening switch SW-1.

The operator will not normally push the stop button or stop switch PB-2; he will just stop feeding cards into the card magazine. If for any reason, the operator wishes to stop the machine with cards in the card magazine, he may depress the stop switch PB-2 to de-energize the device.

In a device constructed in accordance with the invention, data storage cards, having microfilm frames mounted therein, have been cleaned at the rate of approximately 300 data storage cards per minute. Dust particles were completely removed from the data storage cards. Because the data storage cards entering the card receiving compartment had been neutralized of any static charge before and after contact with the cleaning brushes, the data storage cards did not attract dust particles again.

Throughout the specification and claims, when reference is made to data storage cards or data processing cards, it is to be understood that the microfilm frames, mounted in the cards, are included by reference as forming part of a unitary card structure.

While the invention has been described with reference to the structure disclosed herein, it is not confined to the details set forth, and this application is intended to cover such modifications or changes as may come within the purposes of the improvements or the scope of the following claims.

What is claimed is:

1. Apparatus for cleaning data storage cards having microfilm frames mounted therein,
   said apparatus including a compartment having a card receiving slot and a card delivery slot for a card to advance therethrough and an air inlet opening and an air discharge opening,
   power driven conveyor means to advance cards one at a time through said compartment,
   a pair of brushes contra-rotatably mounted in said compartment in position to brush dust particles substantially simultaneously from both sides of cards advanced through said compartment by said conveyor means, card guide means for guiding cards from said card receiving slot and between said contra-rotatably mounted brushes to said card delivery slot, said card guide means including spaced card guide members which are arranged to permit complete cleaning of the upper and lower surface of microfilm in each card and to permit substantially complete cleaning of the upper and lower surface of each card,
   drive means connected to said brushes for rotating said brushes,
   ion discharge means positioned in said compartment for applying a constantly reversing electrostatic field to neutralize the static charge on the cards passed through said compartment, said ion discharge means including a first inductor positioned above the path of travel of cards and a second inductor positioned below the path of travel of cards through said compartment,
   and means connected to said air discharge opening of said compartment for effecting the flow of air through said compartment to remove dust particles brushed from a card by said brushes as they rotate.

2. The apparatus of claim 1 wherein said power driven conveyor means includes a magazine for a supply of cards and card dispensing means for feeding cards one at a time from said magazine through said compartment.

3. The apparatus of claim 1 wherein said power driven conveyor means includes a magazine for a supply of cards to be cleaned,
   reciprocating picker means for feeding cards one at a time from said magazine,
   and endless conveyor means positioned adjacent said reciprocating picker,
   to advance cards through said card guide means between said brushes for discharge from said compartment.

4. Apparatus for cleaning data storage cards having microfilm frames mounted therein,
   said apparatus including a card magazine for storing cards to be cleaned,
   a cleaning compartment positioned adjacent said card magazine,
   a card receiving magazine positioned adjacent said cleaning compartment,
   said cleaning compartment having a card receiving slot and a card delivery slot for a card to advance from said card magazine through said card cleaning compartment to said card receiving magazine,
   said cleaning compartment having an inlet opening and an air discharge opening to permit the flow of air through said cleaning compartment,
   card feeding means positioned adjacent said card magazine for seriatim feeding of cards from said card magazine to said card receiving slot,
   drive feed rolls positioned to forward cards advanced by said card feeding means through said cleaning compartment for discharge through said card delivery slot into said card receiving tray,
   a pair of brushes rotatably mounted in said compartment in position to brush dust particles substantially simultaneously from both sides of cards advanced through said cleaning compartment by said drive feed rolls, spaced card guide members positioned to guide cards between said brushes as a card is advanced from said card receiving slot to said card delivery slot while permitting substantial contact of said brushes with the surfaces of a card,
   a flexible card baffle positioned adjacent said card receiving magazine to check the advance of said cards and to deflect them into said card receiving magazine,
   drive means connected to said brushes for rotating said brushes,
   ion discharge means positioned in said cleaning compartment for applying a constantly reversing electrostatic field to neutralize the static charge on cards passed through said cleaning compartment, said ion discharge means including a first inductor positioned above the path of travel of cards and on one side of said brushes in relation to the path of travel of cards through said brushes and a second inductor positioned below the path of travel of cards and on the opposite side of said brushes from said first inductor, and means connected to said card cleaning compartment to effect the flow of air from said air inlet opening through said cleaning compartment to discharge dust particles removed from cards by said brushes through said air discharge opening.

References Cited in the file of this patent

UNITED STATES PATENTS

| | | |
|---|---|---|
| 1,560,113 | Sandaljian | Nov. 3, 1925 |
| 2,358,334 | Knowlton | Sept. 19, 1944 |
| 2,688,413 | Donehower et al. | Sept. 7, 1954 |
| 2,752,271 | Walkup et al. | June 26, 1956 |
| 2,881,570 | Moore et al. | Apr. 14, 1959 |
| 2,920,987 | Landry et al. | Jan. 12, 1960 |
| 2,980,933 | Schwartz | Apr. 25, 1961 |